(12) United States Patent
Wakai

(10) Patent No.: US 6,196,778 B1
(45) Date of Patent: Mar. 6, 2001

(54) SCREW FIXING PLUG AND COMBINATION OF THE SAME WITH A SCREW

(75) Inventor: Takao Wakai, Osaka (JP)

(73) Assignee: Wakai & Co., Ltd., Osaka (JP)

( * ) Notice: Subject to any disclaimer, the term of this patent is extended or adjusted under 35 U.S.C. 154(b) by 0 days.

(21) Appl. No.: 09/461,747

(22) Filed: Dec. 16, 1999

(30) Foreign Application Priority Data

Dec. 18, 1998 (JP) .................................................. 10-360133

(51) Int. Cl.[7] .............................. F16B 13/04; F16B 13/06
(52) U.S. Cl. .............................. 411/42; 411/55; 411/60.2; 411/80.1
(58) Field of Search ........................ 411/15, 55, 57.1, 411/80.1, 80.5, 42, 60.2

(56) References Cited

U.S. PATENT DOCUMENTS

| 805,037 | * | 11/1905 | Stulz | 411/80.5 |
|---|---|---|---|---|
| 1,248,008 | * | 11/1917 | Pleister | 411/80.5 |
| 4,223,586 | * | 9/1980 | Miller | 411/15 |
| 5,688,090 | * | 11/1997 | Miyamoto | 411/80.5 X |
| 5,749,688 | * | 5/1998 | Wakai | 411/80.1 X |

FOREIGN PATENT DOCUMENTS

507155 * 9/1930 (DE) .................................. 411/80.1

* cited by examiner

*Primary Examiner*—Neill Wilson
(74) *Attorney, Agent, or Firm*—Wenderoth, Lind & Ponack, L.L.P.

(57) ABSTRACT

There is a provided screw fixing plug wherein a head portion pritruding outwardly from an outer circumference of a trunk is integrally formed at one end pf the trunk. An opening into which a screw can be inserted is formed in the head, wherein the trunk is split in half along its axial direction into two legs portions, and wherein surfaces of the leg portions are inclined surfaces extending outwardly. By inserting the screw fixing plug into a starting hole of concrete or mortar and threading a screw into the screw fixing plug, an instrument or a untensil can be tightened to the concrete or mortar.

24 Claims, 5 Drawing Sheets

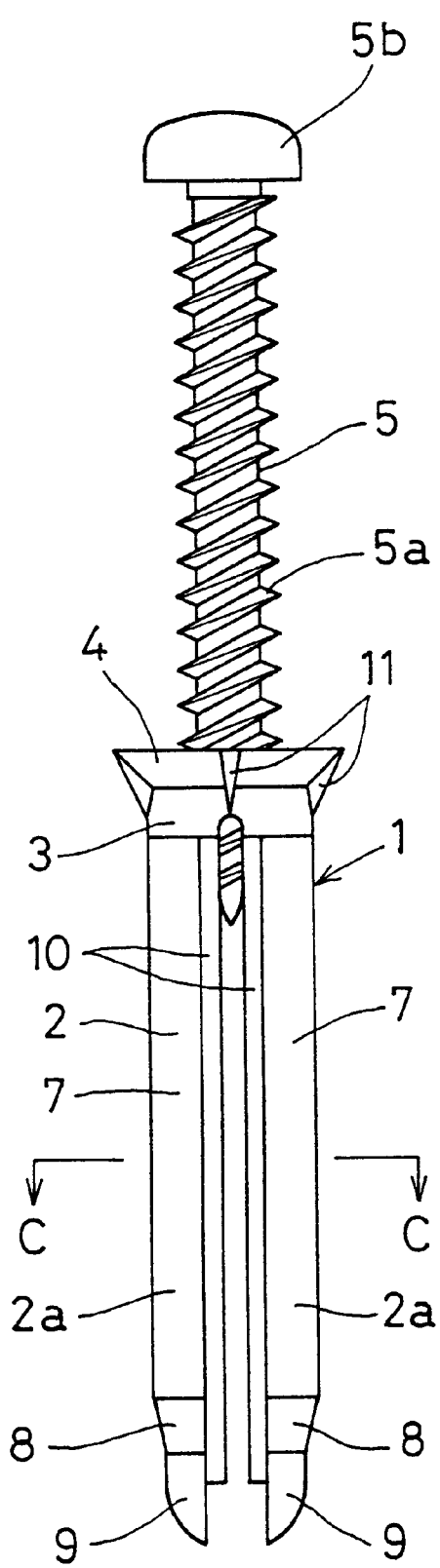
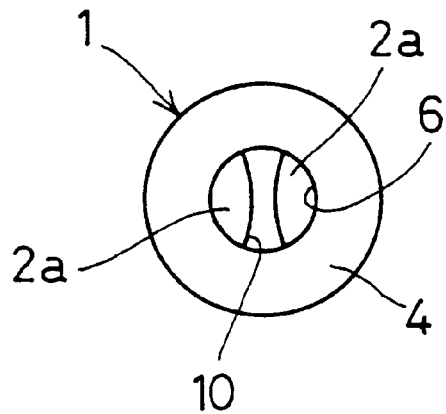
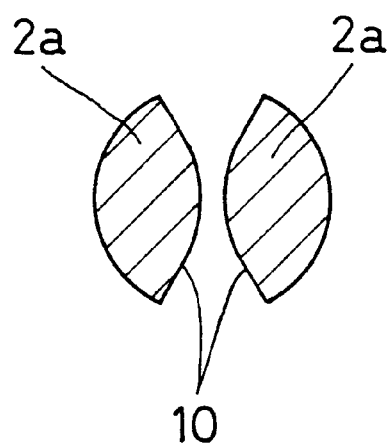

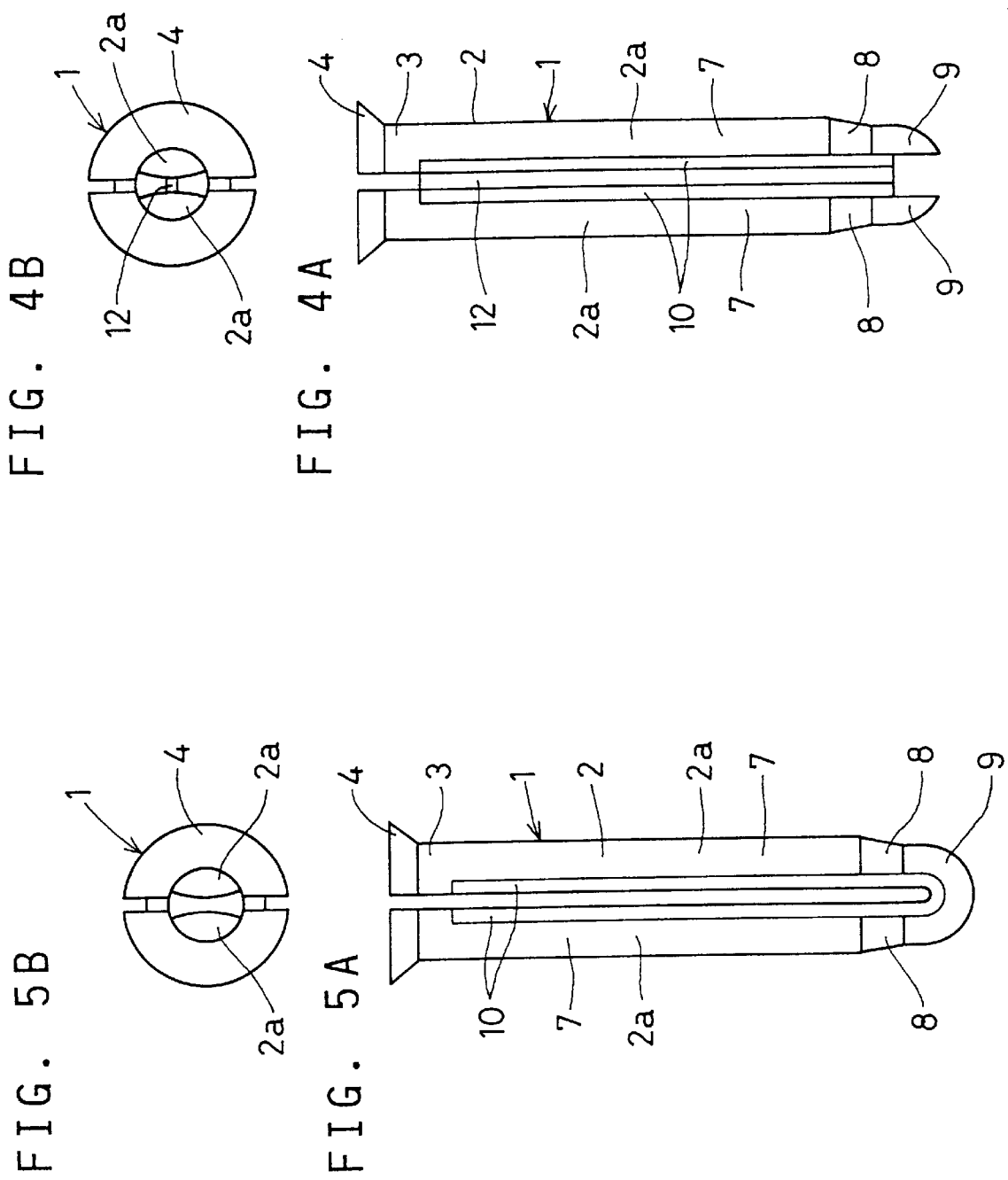

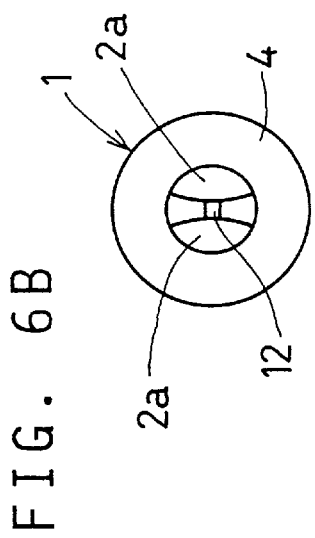
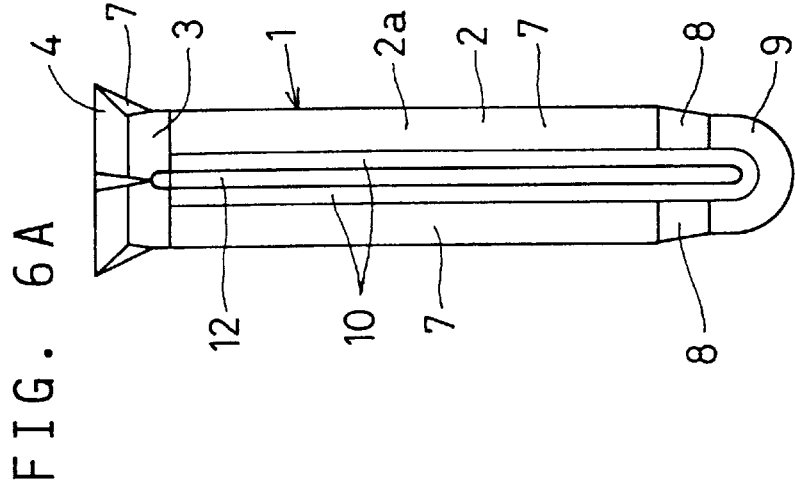
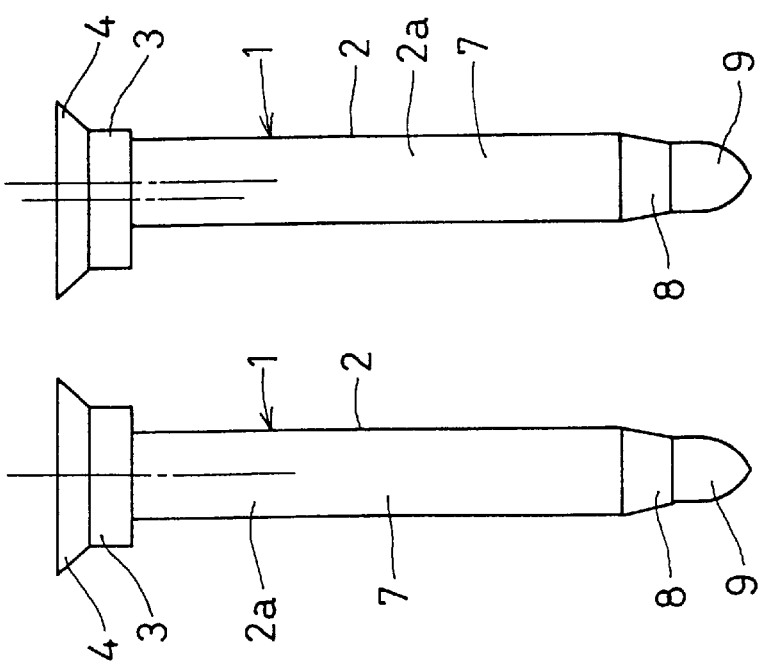

SCREW FIXING PLUG AND COMBINATION OF THE SAME WITH A SCREW

BACKGROUND OF THE INVENTION

This invention relates to a screw fixing plug used to mount instruments or the like to a construction article of concrete or mortar using a combination of the plug and a screw.

Heretofore, in mounting an instrument or the like to a construction article of concrete or mortar using screws, after forming a starting hole by drilling in the concrete or mortar, a cylindrical plug is inserted into the starting hole, a screw is inserted through an instrument superposed on the concrete or mortar, and the screw is tightened into the plug in the starting hole. The screw thus expands the plug, so that the instrument can be tightened to the concrete or mortar.

The conventional plug aims to obtain tightening force by pressing the plug against the inner wall of the starting hole by uniformly expanding the plug by the screw, thus preventing development of a gap between the screw and the starting hole. But since the plug is structured so as to prevent slip between the plug and concrete or mortar by the friction between the outer surface of the expanded plug and the inner wall of the hole in the concrete or mortar, slipping of the plug tends to occur relative to concrete or mortar, because the concrete or mortar is a material that is brittle and easily broken.

An object of this invention is to provide a screw fixing plug which can ensure biting of threads into concrete or mortar, when the plug is unevenly deformed and moved. The threads bite directly into both the concrete or mortar and the plug when the screw is tightened into the plug that is inserted into the starting hole. This increases the tightening force of the plug, and provides a combination of such a plug and a screw.

SUMMARY OF THE INVENTION

According to this invention, there is provided a screw fixing plug comprising a trunk made of a flexible material and having a first end and a second end, with a head at the first end. The trunk is split into a pair of leg portions by a slit extending longitudinally from the first end to the second end. The head at least partially protrudes radially outwardly from the outer periphery of the trunk and is formed with a through hole to receive a screw therein. And, the leg portions have opposed inner surfaces which are convex in section so that the slit narrows toward a diametrical center thereof.

Other features and objects of the present invention will become apparent from the following description made with reference to the accompanying drawings, in which:

BRIEF DESCRIPTION OF THE DRAWINGS

FIG. 1A is a front view of a combination of a screw fixing plug and a screw of a first embodiment;

FIG. 1B is a plan view of the screw fixing plug;

FIG. 1C is a sectional view taken along line c—c of FIG. 1A;

FIG. 4A is a front view of a screw fixing plug of a third embodiment;

FIG. 4B is a plan view of the screw fixing plug of the third embodiment;

FIG. 5A is a front view of a screw fixing plug of a fourth embodiment;

FIG. 5B is a plan view of the screw fixing plug of the fourth embodiment;

FIG. 6A is a front view of a screw fixing plug of a fifth embodiment;

FIG. 6B is a plan view of the screw fixing plug of the fifth embodiment;

FIG. 7A is a side view of a screw fixing plug in which the head portion is coaxial with the trunk portion; and FIG. 7B is a side view of a screw fixing plug in which the head portion is eccentric relative to the trunk portion.

DETAILED DESCRIPTION OF THE PREFERRED EMBODIMENT

Figure 2A:
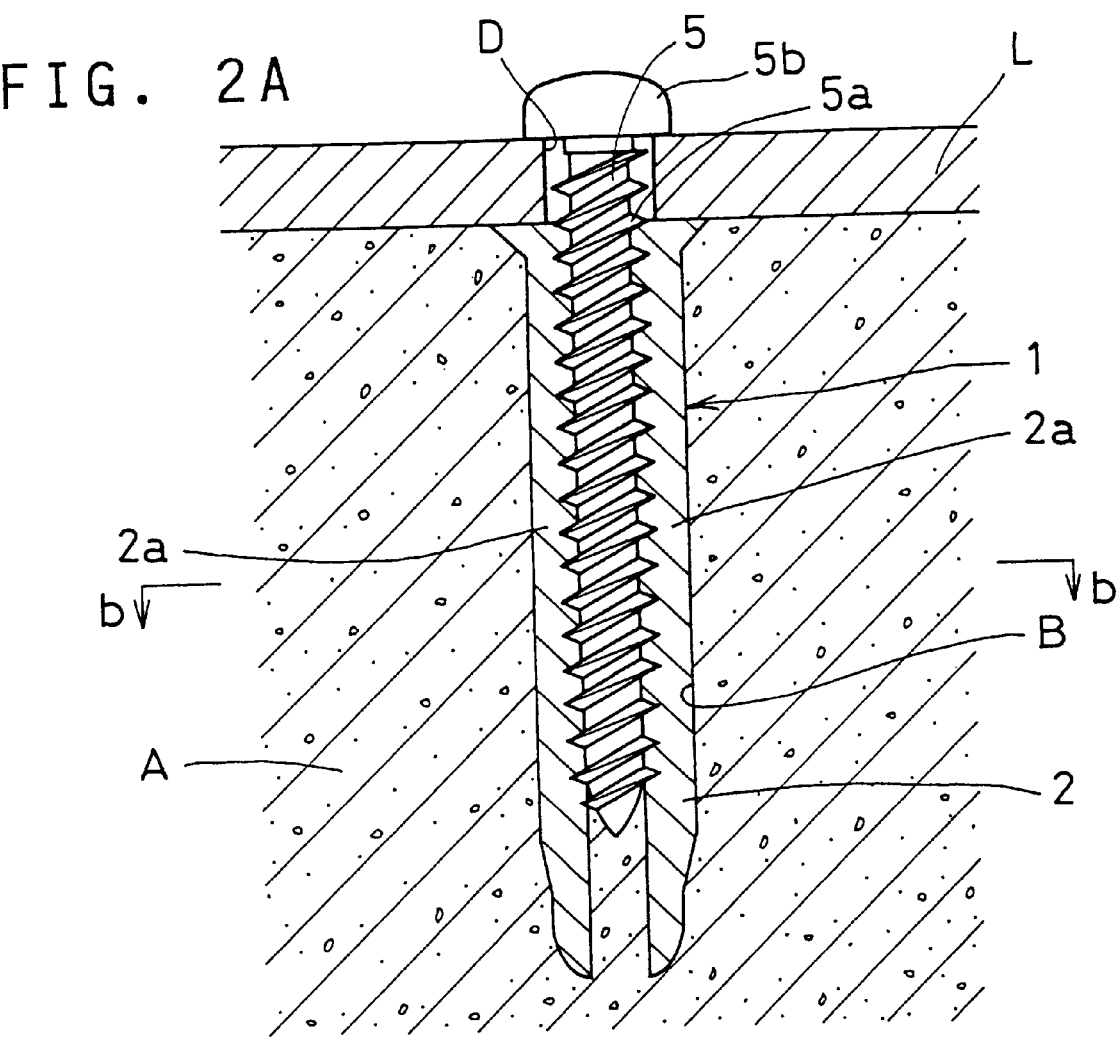
FIG. 2A is a vertical sectional view of the first embodiment in a tightened state.

Hereinbelow, embodiments of this invention are described with reference to the drawings.

In the first embodiment shown in FIGS. 1 and 2, a screw fixing plug 1 comprises a trunk portion 2. A short round shaft portion 3 and a head portion 4 having a larger diameter than that of the trunk portion 2 are integrally formed at one end of the trunk portion which is made of a flexible material such as a plastic. The head portion 4 is formed with an opening 6 having such a diameter that a screw 5 can be inserted thereinto. The trunk portion 2 is split in half in an axial direction over its entire length from the bottom of the shaft portion 3 to form leg portions 2a with a gap or slit therebetween. The leg portions 2a are arranged opposite to each other with their top connected to the shaft portion 3. The head portion 4 may not be the one as shown but may be split into a plurality of portions as shown in FIGS. 4A, 4B, 5A and 5B.

The trunk portion 2 has its leg portions 2a shaped such that a single shaft body having substantially the same outer diameter as the round shaft portion 3 is split in half along the axis with a gap formed between the opposed screw engaging surfaces. A tapered portion 8 and a tapered tip portion 9 are integrally formed on a tip of a straight portion 7 having a predetermined length. The opposed screw engaging surfaces of the split leg portions 2a are formed as inclined surfaces 10 expanding outwardly so that the gap will narrow toward the center (FIG. 1C). The inclined surfaces 10 may be, instead the arcuate surfaces as shown, straight inclined surfaces that extend in opposite directions from the central portion. Thus, the leg portions 2a have a sectional shape having an arcuate outer surface and an arcuate inner surface.

The head 4 provided at the top end of the round shaft portion 3 is formed into the shape of a truncated cone having a larger diameter than the round shaft portion 3. On the outer circumferential surface of this head 4 over the round shaft portion 3, a plurality of turn preventive ribs 11 are provided. The opening 6 extends through the head 4 and the round shaft portion 3 so that by threadedly engaging the tip of a screws in the opening 6 provided in the head 4, a combination in which the tip of the screw 5 is stably held in the screw fixing plug 1 can be obtained.

Figure 3A:
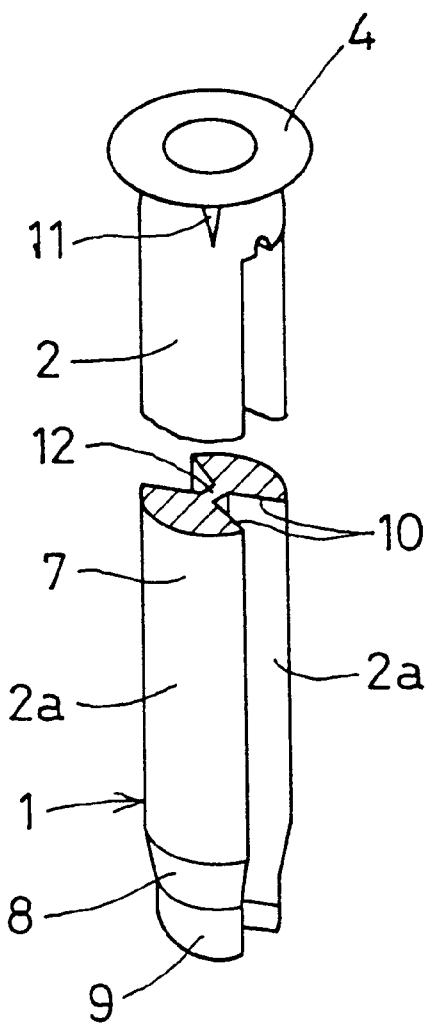
FIG. 3A is a perspective view of a screw fixing plug of a second embodiment.
Figure 3B:
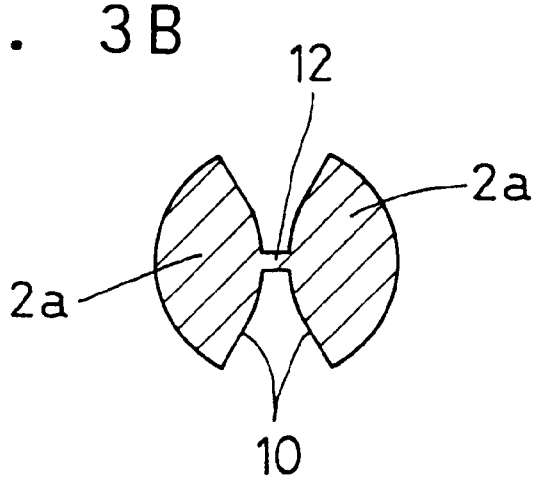
FIG. 3B is a sectional view of a trunk portion of the screw fixing plug of the second embodiment.

In the second embodiment shown in FIGS. 3A and 3B, the leg portions 2a are connected together by a thin breakable film 12 provided between their opposed surfaces 10. This breakable film 12 is made of a material integral with the trunk portion 2. The leg portions 2a may be connected not at the center of the opposed surfaces 10 as shown but at any other position between them. The breakable film 12 prevents the leg portions 2a from spreading inadvertently.

In the third embodiment shown in FIGS. 4A AND 4B, the head 4 and the round shaft portion 3 are split in half by a gap connecting with the gap between the leg portions 2a. Since the leg portions 2a are connected together by the breakable film 12, even though the head 4 and the round shaft portion 3 are split in half, the screw fixing plug 1 will not separate. In the third embodiment, the turn preventive ribs on the outer circumferential surface of the head 4 and the round shaft portion 3 are omitted.

In the fourth embodiment shown in FIGS. 5A and 5B, the split leg portions 2a are connected together at their tips. Since the leg portions 2a will not separate by connecting them at the tips, the breakable film between the leg portions 2a is omitted. But the breakable film may be provided.

In the fifth embodiment shown in FIGS. 6A and 6B, the split leg portions 2a have their tips connected together, and they are connected together by the breakable film 12.

In each of the above-described first to fifth embodiments, as shown in FIG. 7A, the head portion 4 and the round shaft portion 3 may be provided coaxially relative to the axis of the trunk portion 2, or as in FIG. 7B, they may be provided eccentrically relative to this axis.

Though not shown, in each of the second to fifth embodiments, too, it is possible to form a combined body in which the screw 5 is threaded into the opening 6 of the head portion 4 of the screw fixing plug 1.

Figure 2B:
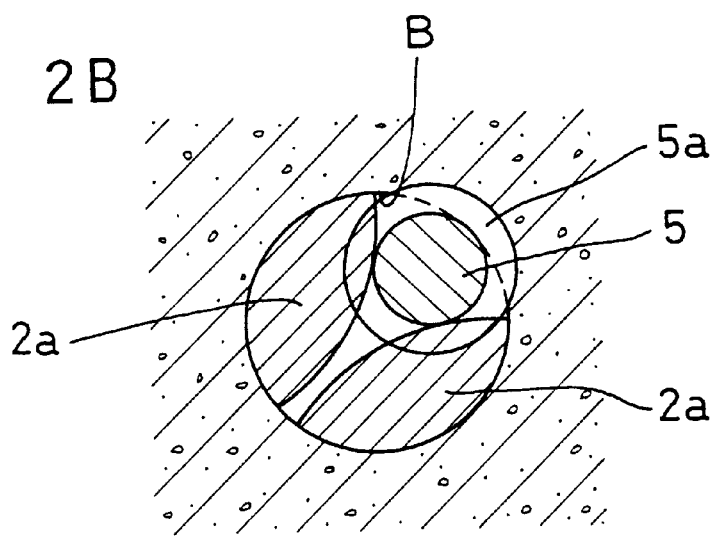
FIG. 2B is a sectional view taken along arrow b—b of FIG. 2A.

Next, how to use the screw fixing plug 1 is described, taking the screw fixing plug 1 of the first embodiment shown in FIGS. 2A and 2B as an example.

A starting hole B, having such an inner diameter and depth that the entire screw fixing plug 1 from the trunk portion 2 to the head portion 4 is receivable therein formed in a construction object A of concrete or mortar by use of a drill. After inserting the trunk portion 2 of the screw fixing plug 1 into the starting hole B, an object L to be fixed such as an instrument and a device, is put on the construction object A. A hardened coarse-pitched screw 5 is threaded from a through hole D, drilled in the object L of the fixed, and the opening 6 of the screw fixing plug 1 toward and between the leg portions 2a.

When the threaded screw 5 passes through the head portion 4 and the round shaft portion 3 and penetrates between the leg portions 2a, since the opposed surfaces of the leg portions 2a are formed as convex surfaces with the smallest distance between these surfaces 2a being substantially smaller than the root diameter of the screw 5, as shown in FIG. 1A, as the screw 5 penetrates, the trunk portion is pushed toward one side of the starting hole B as shown in FIG. 2B. As a result, the screw 5 will be positioned eccentric relative to the axis of the trunk portion 2, so that the threads 5a of the screw 5 proceed while cutting threads both in the concrete or mortar surface and the leg portions 2a until the object L to be fixed is tightened with the head portion 5b of the screw 5.

If the screw fixing plug 1 is made from a flexible plastic, high heat is produced while the screw 5 is threaded between the leg portions 2a. By this heat, the leg portions 2a are melted and become bonded to the screw 5, so that the effect of preventing the screw from loosening increases. Also, the screw fixing plug 1 made of plastic absorbs micro-vibrations.

Also, the leg portions 2a made of a plastic serve as protective packings which absorb over-torque after tightening the screw, and prevents breakage of threads formed on the leg portions 2a. Also, since the leg portions 2a deformed under compression are pressed against the concrete or mortar surface, it is possible to remove the screw 5 several times. The tightening strength will not decrease either.

With the screw fixing plug 1 of the third embodiment shown in FIGS. 4A and 4B, in which the head portion 4 and the round shaft portion 3 are split in half, immediately after the start of threading of the screw 5, the head portion 4 will spread, so that due to friction with the concrete or mortar surface, slipping of the screw fixing plug 1 is prevented.

Further, with the embodiments in which the leg portions 2a are connected together by the breakable film 12, the film serves as a guide portion to offset the screw 5 in one direction relative to the axis of the trunk portion 2 as the screw penetrates between the leg portions 2a. When cut under the pressure of threading of the screw 5, the breakable film 12 finishes its role.

If the combination of the screw fixing plug 1 and the screw 5 is used as it is, starting holes are drilled in the construction object A of concrete or mortar and the object L. Then, be fixed, the screw fixing plug 1 of the combined body is inserted through the starting hole of the object L to be fixed and into the starting hole of the construction object A with the object L superposed on the construction object A until the head portion 4 of the screw fixing plug 1 abuts the surface of the object L to be fixed. In this state, the screw 5 is tightened. Tightening is thus carried out with the head portion 4 pressing the object L to be fixed.

As described above, according to this invention, as the screw 5 penetrates, the trunk portion 2 is pushed toward one side by the functions of the sectional shape of the leg portions 2a. As a result, the screw 5 is positioned eccentric relative to the axis of the trunk portion 2, so that the screw 5 proceeds while cutting threads both in the concrete or mortar surface and the trunk 2. Thus, strong tightening is obtained without loosening. Also, since the trunk portion 2 serves as a protective packing, it absorbs over-torque after screw tightening, and prevents breakage of the threads formed on the trunk portion 2. Further, since the compression-deformed trunk portion 2 is pressed against the concrete or mortar surface, it is possible to remove the screw several times without decreasing the tightening strength.

Also, in an arrangement in which the head portion 4 and the round shaft portion 3 are split in half, immediately after the start of the threading of the screw 5, the head portion 4 will spread, so that due to friction with the concrete or mortar surface, it is possible to prevent slipping of the screw fixing plug 1. Further, with the screw fixing plug 1 in which the leg portions 2a are connected together by the breakable film 12, as the screw 5 penetrates between the leg portions 2a, the breakable film 12 becomes a guide portion that offsets the screw 5 in one direction relative to the axis of the trunk portion z.

Further, the combined body of the screw fixing plug 1 and the screw 5 can be used as it is by inserting the screw fixing plug 1 into a starting hole B. Thus the screw tightening work can be carried out efficiently.

What is claimed is:

1. A combination of a screw fixing plug and a screw, with the screw having a head and a shank with a tip, wherein the shank defines a root diameter and the screw fixing plug comprises:

a flexible trunk having a first end and a second end, with said trunk being split into a pair of leg portions by a slit extending longitudinally from said first end to said second end, with said leg portions having opposed inner surfaces that are inwardly convex such that said slit narrows towards a diametrical center of said trunk to a dimension that is substantially smaller than the root diameter defined by said shank of said screw; and a head at said first end, with said head at least partially protruding radially outwardly from an outer periphery of said trunk and being formed with a through hole to receive said tip of said shank therein.

2. The combination according to claim 1 wherein said leg portions of said trunk are joined together at said second end thereof.

3. The combination according to claim 1, wherein said head has a larger diameter than said trunk.

4. A screw fixing plug comprising:

a flexible trunk having a first end and a second end, with said trunk being split into a pair of leg portions by a slit extending longitudinally from said first end to said second end, with said leg portions having opposed inner surfaces that are inwardly convex such that said slit narrows towards a diametrical center of said trunk; and a head at said first end, with said head at least partially protruding radially outwardly from an outer periphery of said trunk and being formed with a through hole to receive a screw therein, and with said head being split into two portions.

5. The screw fixing plug according to claim 4, wherein said leg portions of said trunk are joined together at said second end thereof.

6. The screw fixing plug according to claim 4, wherein said two leg portions are joined together by a breakable film extending longitudinally.

7. The screw fixing plug according to claim 4, wherein said head has a larger diameter than said trunk.

8. The screw fixing plug according to claim 4, wherein said head is eccentric relative to a central axis of said trunk.

9. A combination of the screw fixing plug of claim 4 and a screw comprising a head and a shank having a tip inserted into said through hole formed in said head of said screw fixing plug.

10. A screw fixing plug comprising:

a flexible trunk having a first end and a second end, with said trunk being split into a pair of leg portions by a slit extending longitudinally from said first end to said second end, with said leg portions having opposed inner surfaces that are inwardly convex such that said slit narrows towards a diametrical center of said trunk, wherein said leg portions are joined together by a breakable film extending longitudinally; and a head at said first end, with said head at least partially protruding radially outwardly from an outer periphery of said trunk and being formed with a through hole to receive a screw therein.

11. The screw fixing plug according to claim 10, wherein said leg portions of said trunk are joined together at said second end thereof.

12. The screw fixing plug according to claim 10, wherein said head has a larger diameter than said trunk.

13. The screw fixing plug according to claim 10, wherein said head is eccentric relative to a central axis of said trunk.

14. A combination of the screw fixing plug of claim 10 and a screw comprising a head and a shank having a tip inserted into said through hole formed in said head of said screw fixing plug.

15. A screw fixing plug comprising:

a flexible trunk having a first end and a second end, with said trunk being split into a pair of leg portions by a slit extending longitudinally from said first end to said second end, with said leg portions having opposed inner surfaces that are inwardly convex such that said slit narrows towards a diametrical center of said trunk; and a head at said first end, with said head at least partially protruding radially outwardly from an outer periphery of said trunk and being formed with a through hole to receive a screw therein, and with said head being eccentric relative to a central axis of said trunk.

16. The screw fixing plug according to claim 15, wherein said leg portions of said trunk are joined together at said second end thereof.

17. The screw fixing plug according to claim 15, wherein said head has a larger diameter than said trunk.

18. A combination of the screw fixing plug of claim 15 and a screw comprising a head and a shank having a tip inserted into said through hole formed in said head of said screw fixing plug.

19. A combination of a screw fixing plug and a screw having a root diameter, wherein the screw fixing plug comprises:

a plug head; and a flexible trunk having a first end and a second end, with said trunk being split into a pair of leg portions by a slit extending longitudinally from said first end to said second end, with said leg portions having opposed inner surfaces such that said slit narrows towards a diametrical center of said trunk to a dimension that is smaller than said root diameter such that as said screw is inserted through said plug head and between said leg portions, said leg portions become eccentrically displaced relative to said axis.

20. The combination according to claim 19, wherein said screw includes a screw head with a shank axially extending from said screw head and terminating at a tip.

21. The combination according to claim 20, wherein said plug head is located at said first end of said trunk and extends at least partially radially outwardly relative to an outer periphery of said trunk.

22. The combination according to claim 21, wherein said plug head has an opening therein to receive the tip of said screw.

23. The combination according to claim 22, wherein said opposed inner surfaces are each convex in shape.

24. The combination according to claim 19, wherein said opposed inner surfaces are each convex in shape.

* * * * *